United States Patent
Hsu et al.

(10) Patent No.: US 9,779,476 B2
(45) Date of Patent: Oct. 3, 2017

(54) IMAGE SIGNAL PROCESSING METHOD AND IMAGE SIGNAL PROCESSOR FOR NOISE REDUCTION

(71) Applicant: Realtek Semiconductor Corp., HsinChu (TW)

(72) Inventors: Chih-Yu Hsu, Hsinchu County (TW); Wen-Tsung Huang, Chiayi (TW); Shih-Tse Chen, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 25 days.

(21) Appl. No.: 14/859,373

(22) Filed: Sep. 21, 2015

(65) Prior Publication Data
US 2016/0086309 A1 Mar. 24, 2016

(30) Foreign Application Priority Data
Sep. 22, 2014 (TW) .............. 103132661 A

(51) Int. Cl.
| | |
|---|---|
| G06T 5/00 | (2006.01) |
| H04N 5/347 | (2011.01) |
| G06T 3/40 | (2006.01) |
| H04N 9/07 | (2006.01) |

(52) U.S. Cl.
CPC ............ *G06T 3/4015* (2013.01); *G06T 5/002* (2013.01); *H04N 5/347* (2013.01); *H04N 9/07* (2013.01)

(58) Field of Classification Search
CPC ....... G06T 3/4015; G06T 5/002; H04N 5/347; H04N 9/07
See application file for complete search history.

(56) References Cited

U.S. PATENT DOCUMENTS

| | | | |
|---|---|---|---|
| 8,417,046 B1* | 4/2013 | McDougal | G06T 5/008 382/254 |
| 2003/0043285 A1* | 3/2003 | Makino | H04N 3/1512 348/235 |
| 2005/0281458 A1 | 12/2005 | Adams | |
| 2006/0187324 A1 | 8/2006 | Lin | |

(Continued)

FOREIGN PATENT DOCUMENTS

WO 2013187127 A1 12/2013

OTHER PUBLICATIONS

Li et al. ("Image restoration after pixel binning in image sensors," Tsinghua Science and Technology, Vo. 14, Issue 4(2009)].*

(Continued)

*Primary Examiner* — Yubin Hung
(74) *Attorney, Agent, or Firm* — Winston Hsu

(57) ABSTRACT

An image signal processing method includes: receiving an original color filter array (CFA) image and a pixel binned CFA image; computing a specific information of the pixel binned CFA image; and processing the original CFA image according to the specific information. The associated image signal processor includes an input terminal, an operating unit and a processing unit, wherein the input terminal is for receiving an original CFA image and a pixel binned CFA image, the operating unit is for computing a specific information of the pixel binned CFA image, and the processing unit is for processing the original CFA image according to the specific information and utilizing the pixel binned CFA image.

14 Claims, 7 Drawing Sheets

(56) References Cited

U.S. PATENT DOCUMENTS

| | | | |
|---|---|---|---|
| 2009/0225277 A1* | 9/2009 | Gil | A61B 5/14555 351/206 |
| 2010/0150440 A1* | 6/2010 | Kwak | H04N 9/045 382/167 |
| 2010/0182464 A1* | 7/2010 | Lukac | H04N 9/045 348/273 |
| 2011/0188748 A1* | 8/2011 | Adams, Jr. | H04N 9/045 382/167 |
| 2012/0093405 A1* | 4/2012 | Lee | H04N 9/64 382/167 |
| 2012/0327269 A1* | 12/2012 | Hwang | H04N 5/23219 348/234 |
| 2013/0021447 A1* | 1/2013 | Brisedoux | H04N 5/2258 348/47 |
| 2015/0138398 A1* | 5/2015 | Hayashi | H04N 9/045 348/234 |

OTHER PUBLICATIONS

Buades, A.; Coll, B.; Morel, J.-M.; Sbert, C.,IEEE Transactions on Image Processing, vol. 18, Issue No. 6, Jun. 2009, pp. 1192-1202.

* cited by examiner

IMAGE SIGNAL PROCESSING METHOD AND IMAGE SIGNAL PROCESSOR FOR NOISE REDUCTION

BACKGROUND OF THE INVENTION

1. Field of the Invention

The embodiments disclosed by this present invention relate to pixel binning of image signal processing, and more particularly, to an image signal processing method which refers to both an original color filter array image and a pixel binned color filter array image, and an associated device.

2. Description of the Prior Art

In image signal processing, the image quality of a color filter array (CFA) image is affected by photon noise, dark current noise and readout noise. To eliminate/reduce noise in the CFA image, often at least one de-noising process is executed in a Bayer domain or some other color space.

U.S. Pat. No. 8,295,631B2 discloses a pixel value technique in the Bayer color filter array which uses weighted means to adjust luminance and chrominance values according to the local edge response to eliminate noise. In a situation where the noise floor is unknown and line buffer resources are limited, the effects of the de-noising method are suppressed and may experience the side effects of distortion or vague images.

U.S. Pat. No. RE44482E1 discloses an active CMOS comprising a selection circuitry for selecting saved charge to achieve pixel binning, which can reduce the readout noise and the required exposure time. As the pixels are binned, however, the resolution of the image will be affected. A novel technique is therefore needed to overcome the problems of the prior art.

SUMMARY OF THE INVENTION

An image signal processing method which refers to both an original CFA image and a pixel binned CFA image and an associated device are disclosed to solve the abovementioned problems.

According to a first exemplary embodiment of the present invention, an image signal processing method is disclosed which comprises: receiving an original CFA image and a pixel binned CFA image; using an operation unit to compute a specific information of the pixel binned CFA image; and processing the original CFA image according to the specific information.

According to a second exemplary embodiment, an image signal processor is disclosed which comprises an input terminal, an operation unit, and a processing unit, wherein the input terminal is arranged to receive the original CFA image and the pixel binned CFA image, the operation unit is arranged to compute a specific information of the pixel binned CFA image, and the processing unit is arranged to process the original CFA image according to the specific information.

The spirit of the present invention utilizes the advantages of the pixel binning technique to improve the flow of digital image signal processing (ISP) and reduce the noise of the output image without losing resolution. The present invention can thereby enhance the visual experience and simultaneously maintain or deduce the noise level of visual perception via making it easier to identify texture of the image. The disclosed technique can be combined with the current ISP architecture rather than discarding the original architecture, so the design cost is saved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

As is well-known, under the cover of the CFA, each pixel of a charge coupled device only records a single color. The analog signal will be affected by interference due to noise (e.g. the readout noise) before it is output to the ISP. Errors in the ISP may occur, generating distortion which is observable to the human eye, especially for images shot in a low-light environment where the noise level is very high.

Figure 1:
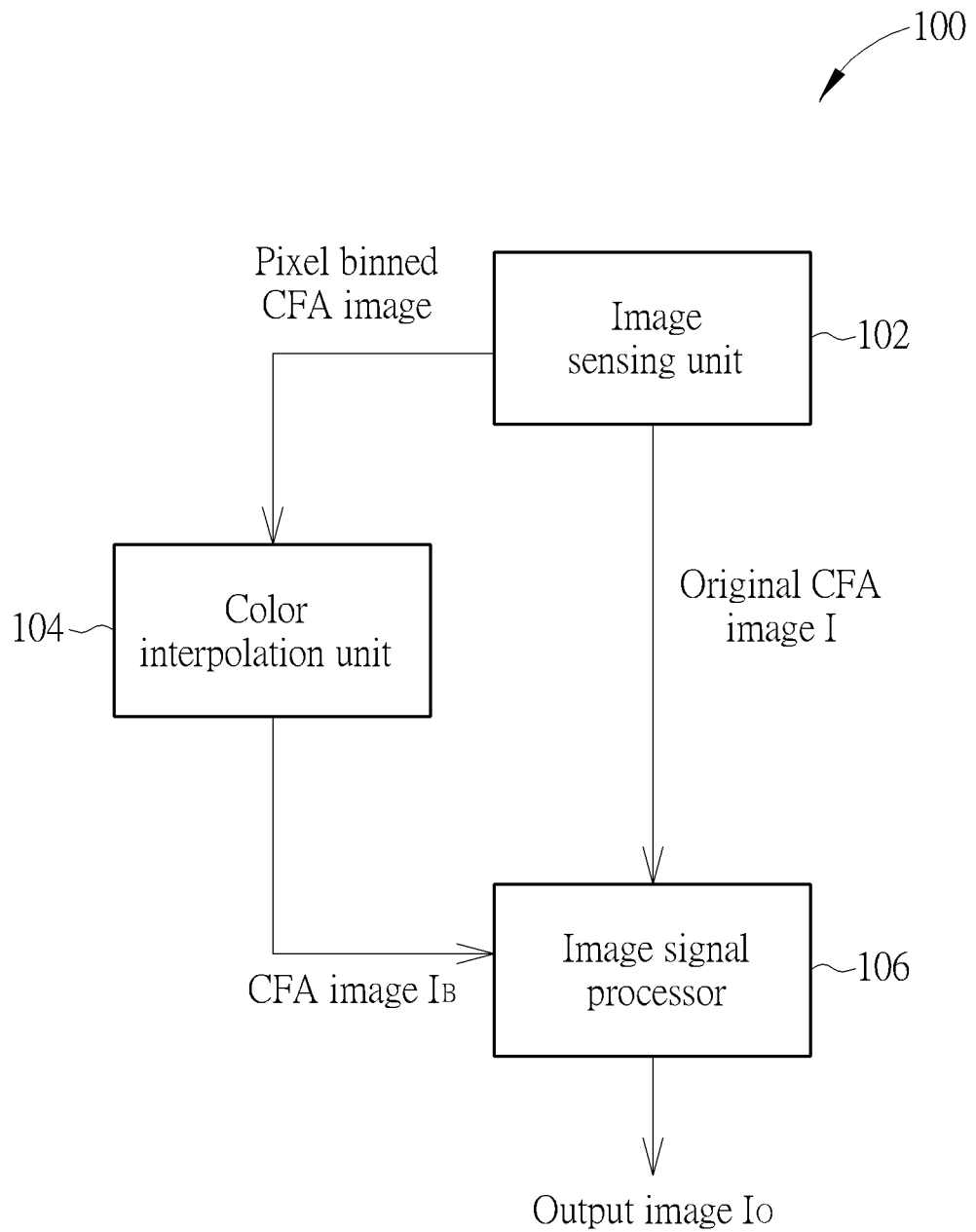
FIG. 1 is a diagram illustrating an image signal processor in an image processing system of the present invention.

FIG. 1 is a diagram illustrating an image signal processor in an image processing system 100 according to an exemplary embodiment of the present invention. In the image processing system 100, an image sensing unit 102 outputs an original CFA image I and a pixel binned CFA image, wherein the pixel binned CFA image and the original CFA image I display the same view/image content with different resolution. In practice, the image sensing unit 102 may only provide the original CFA image I and further compute the pixel binned CFA image. As the size of the pixel binned CFA image is smaller than the original CFA image I, a color interpolation unit 104 performs an interpolation processing on the pixel binned CFA image to restore its size to that of the original CFA image I. The color interpolation unit 104 can be any kind of interpolation algorithm, e.g. bilinear interpolation. The color interpolation unit 104 outputs a CFA image $I_B$ which is outputted with the original CFA image I to an image signal processor 106. It should be noted that the color interpolation unit 104 can be merged into the image sensing unit 102 and the image signal processor 106, i.e. any substantially identical device falls within the scope of the present invention. The main technical feature of the present invention is the image signal processor 106 which will be described in detail later.

Figure 2:
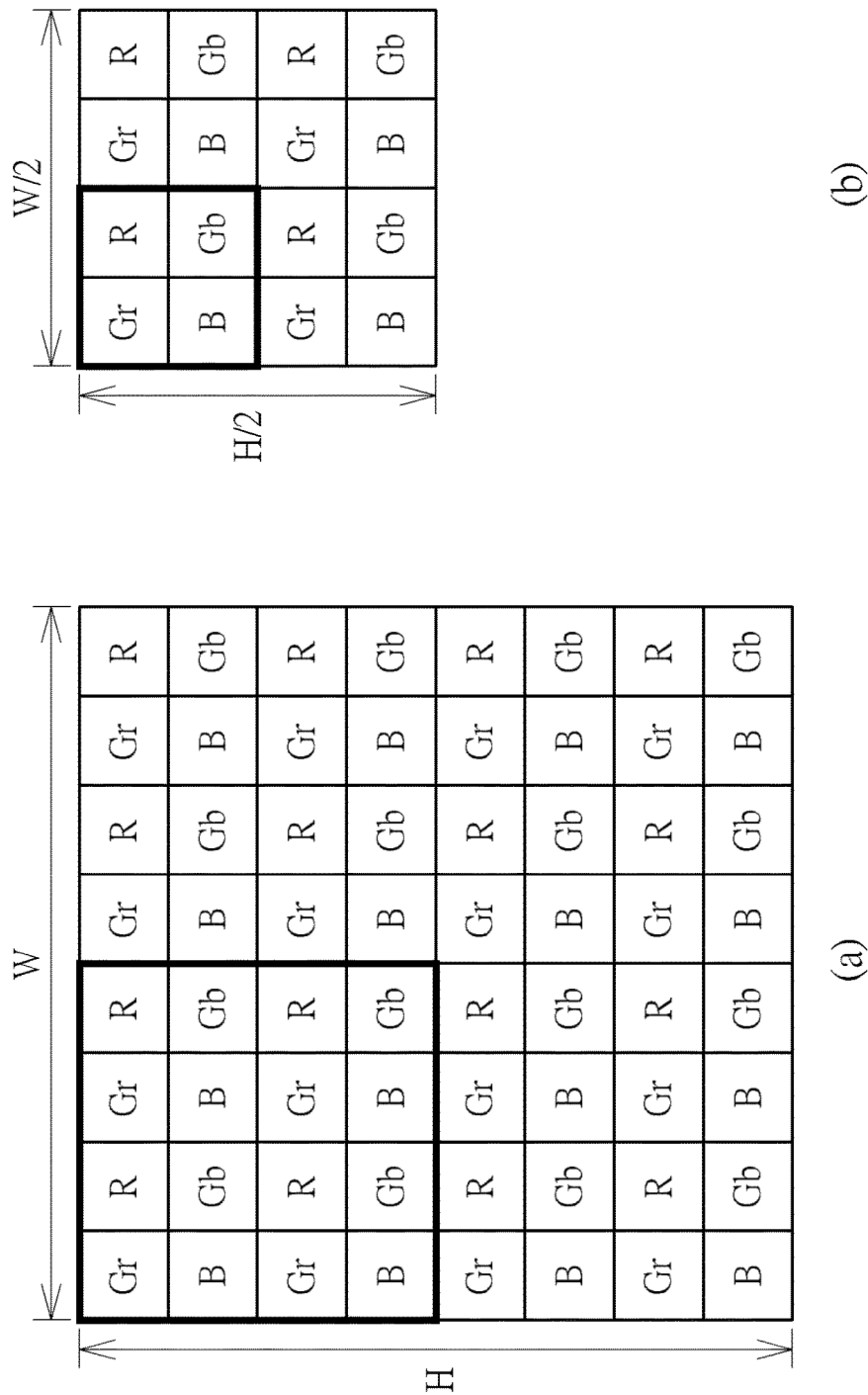
FIG. 2 is a diagram illustrating a pixel binning operation.

FIG. 2 is a diagram illustrating an example of the above-mentioned pixel binning operation. For the example of the Bayer pattern CFA, each 2*2 pixel can be regarded as the basic Bayer pattern unit. Each basic Bayer pattern unit comprises four color channels. As shown in FIG. 2A, when a pixel binning operation is executed on the original CFA, the induced charges of the four identical color channels (e.g. four Grs) of the 4*4 pixel is combined as a super pixel to generate the pixel binned CFA shown in FIG. 2B. The overall resolution is reduced to W/2×H/2 from W×H. However, as the number of times of readout and the scale of readout noise interference for each pixel decrease, the Signal-to-Noise Ratio (SNR) can be improved and thus the required exposure time can be shortened. That is, although the resolution of the pixel binned CFA is lower than the original CFA, the noise level is lower as well. The present invention utilizes the advantages of higher resolution from the original CFA and the lower noise level from the pixel binned CFA in ISP pipeline.

Figure 3:
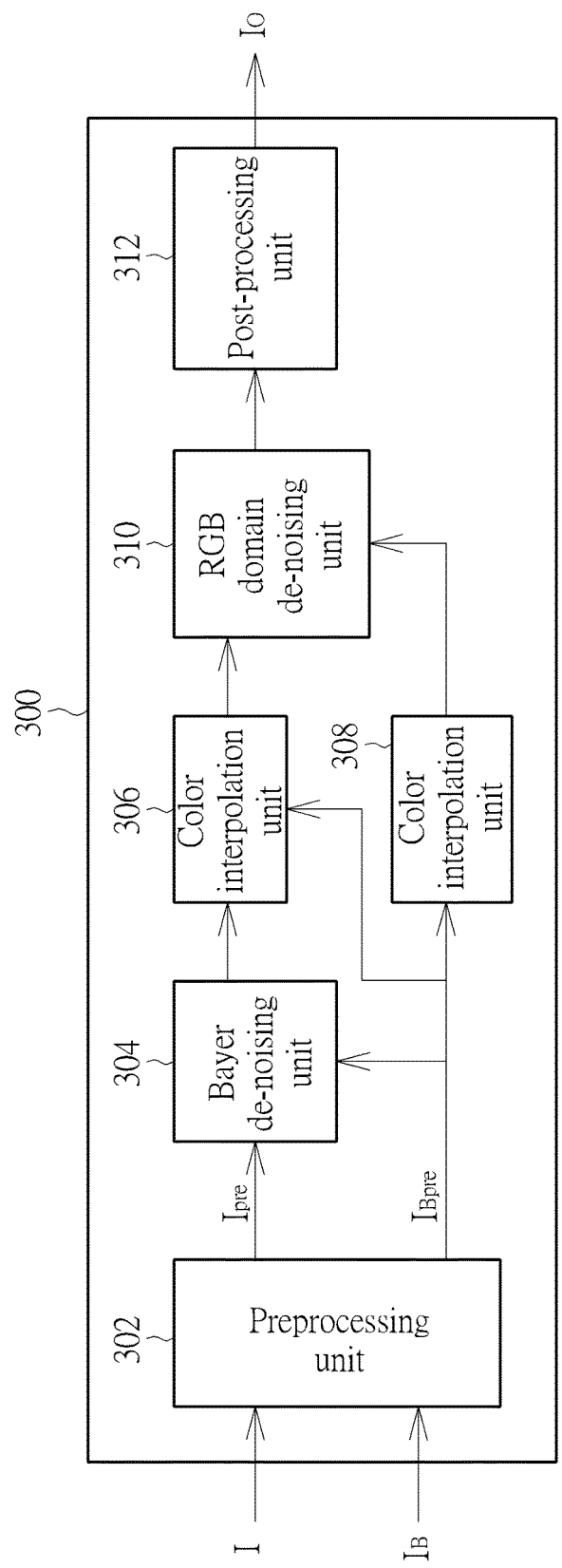
FIG. 3 is a diagram illustrating a first embodiment of the image signal processor of the present invention.

FIG. 3 is a diagram illustrating a first embodiment of the image signal processor of the present invention. The image signal processor 300 generates the output image $I_O$ according to the original CFA image I and the CFA image $I_B$. A preprocessing unit 302 executes processes comprising Lens Shading Correction and Auto White Balance on the original CFA image I and the CFA image $I_B$. The post-processing unit 312 comprises Color Calibration, Gamma Correction, GbGr Unbalance Correction and Dead Pixel compensation. The architecture is not limited in the present invention. The pre-processing unit 302 and the post-processing unit 312 are not necessary elements and their related technical details are omitted here. An after pre-processed original CFA image $I_{pre}$ and an after pre-processed CFA image $I_{Bpre}$ are outputted by the pre-processing unit 302 according to the original CFA image I and the CFA image $I_B$. The essence of the present invention is to refer to the after pre-processed CFA image $I_{Bpre}$ to help a Bayer de-noising unit 304, a color interpolation unit 306 and a RGB domain de-noising unit 310 perform corresponding processes, in which the obtained results are better than the results would be without referring to the after pre-processed CFA image $I_{Bpre}$. The related details of the Bayer de-noising unit 304, the color interpolation unit 306 and the RGB domain de-noising unit 310 are described later.

Figure 4:
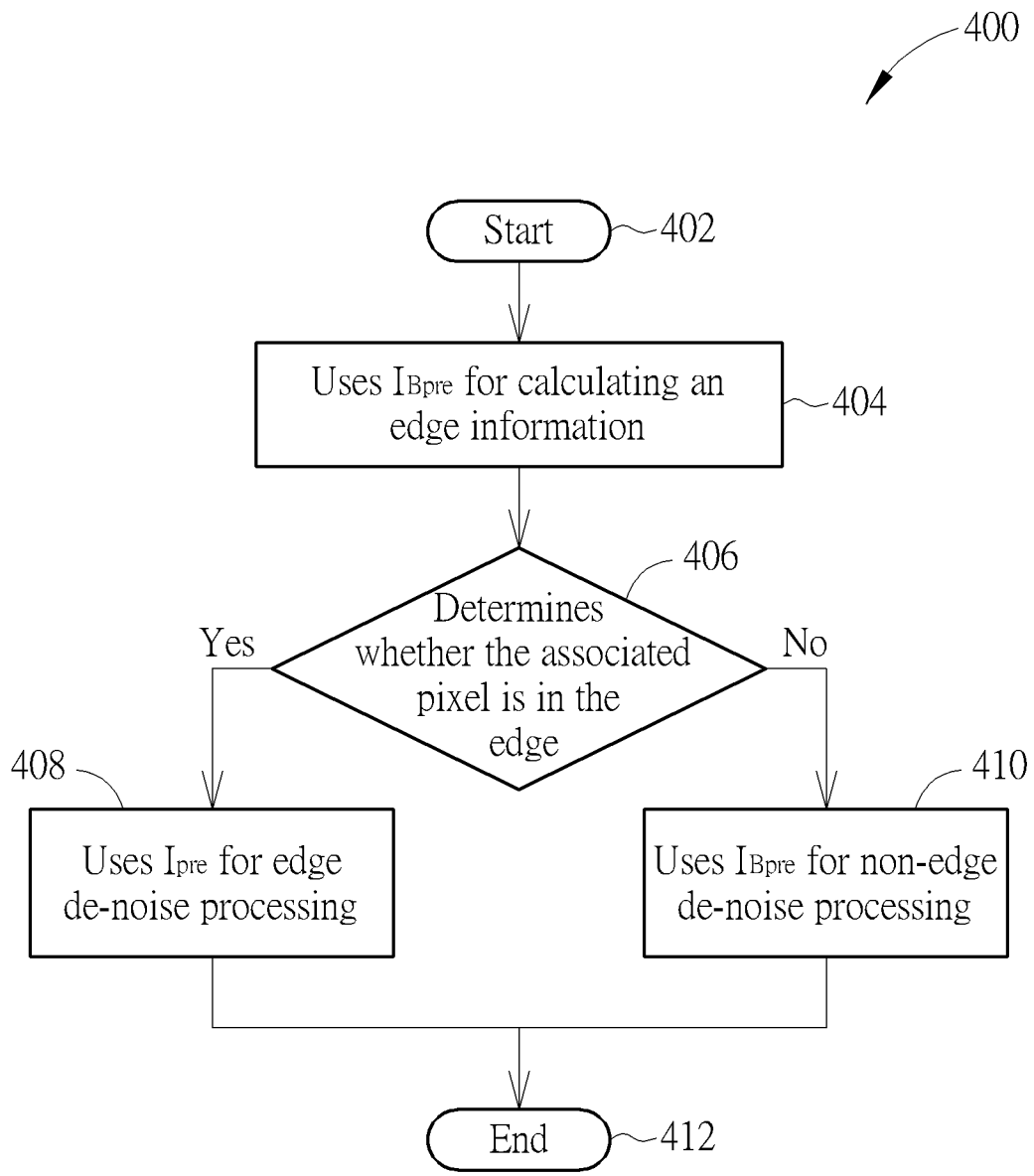
FIG. 4 is a flowchart illustrating a Bayer domain de-noising method of the present invention.

FIG. 4 is a flowchart illustrating a Bayer domain de-noising method of the present invention. If the same result can be obtained, the steps of the flow in FIG. 4 do not need to be followed step by step, and do not need to be executed consecutively, i.e. other steps can be inserted. In addition, some steps in FIG. 4 can be omitted according to different embodiments or design requirements. When the Bayer de-noising method 400 is applied in the Bayer de-noising unit 304, the noise of the after pre-processed original CFA image $I_{pre}$ is reduced. The pixel content of the after pre-processed original CFA image $I_{pre}$ can be divided into an edge pixel part and a non-edge pixel part. The first step of the method is judging whether each pixel of the after pre-processed original CFA image $I_{pre}$ is an edge pixel part or a non-edge pixel part. As the after pre-processed CFA image $I_{Bpre}$ has lower noise, i.e. higher credibility, in step 404, the Bayer de-noising method 400 uses the after pre-processed CFA image $I_{Bpre}$ as a reference for calculating an edge information. In step 406, it can be determined whether each pixel is an edge pixel or non-edge pixel according to the pixel information computed in step 404. It should be noted that the mechanism for determining a pixel as edge pixel can be performed based on a portion of the pixel or the entire image.

The after pre-processed original CFA image $I_{pre}$ preserves the edge more completely; therefore, for the edge pixel, step 408 inputs the after pre-processed original CFA image $I_{pre}$ into a noise filter in the Bayer de-noising unit 304 (which is not shown in FIG. 3) to de-noise $I_{pre}$. The specific de-noising method, for example, median filtering, can be performed on adjacent pixels with the same color channel according to the estimated direction of the edge; however, this is not limited. For the non-edge pixel, step 410 inputs the after pre-processed CFA image $I_{Bpre}$ into the noise filter in the Bayer de-noising unit 304 to de-noise $I_{pre}$ accordingly to reduce the noise in non-edge region to which human eyes are more sensitive. In addition, step 404 in this embodiment can be changed to compute the scale of noise interference or the scale of texture complexity. The following steps can be amended accordingly.

Figure 5:
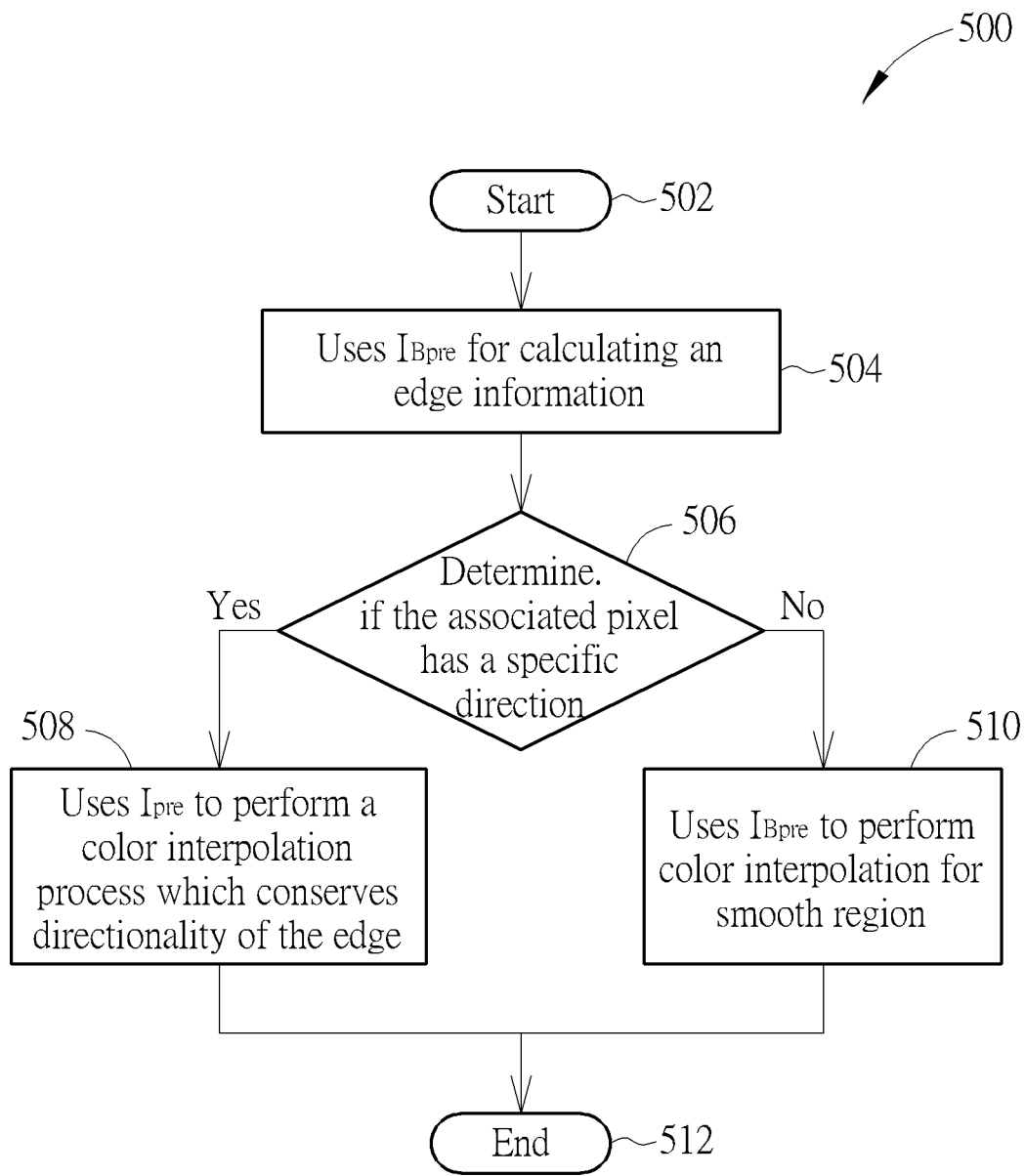
FIG. 5 is a flowchart illustrating a method of color interpolation of the present invention.

For the color interpolation unit 306, a method similar to the Bayer de-noising method 400 can be utilized. In the original CFA image I outputted by the sensor, each pixel only records the color channel information of either red, green, or blue, so color interpolation is needed to complement the information of the other two color channels that each pixel lacks. FIG. 5 is a flowchart illustrating a method of color interpolation according to the present invention. If the same result can be obtained, the steps of the flow in FIG. 5 do not need to be followed step by step, and do not need to be executed consecutively, i.e. other steps can be inserted. In addition, some steps in FIG. 5 can be omitted according to different embodiments or design requirements. The color interpolation method 500 can be applied in the color interpolation unit 306 in FIG. 3. In step 504, the after pre-processed CFA image $I_{Bpre}$ is referred to for computing an edge information of the pixel content outputted after the Bayer de-noising unit 304. In step 506, the edge information is judged to determine if a pixel has a specific direction (e.g. horizontal or vertical). If yes, then the flow moves to step 508 to input the pixel content outputted after the Bayer de-noising unit 304 into the color interpolation unit 306 to perform a color interpolation process which conserves directionality of the edge. Otherwise, the pixel is considered in a smooth region, and the flow moves to step 510 to input the after pre-processed CFA image $I_{Bpre}$ into the color interpolation 306 to perform color interpolation which does not conserve directionality of the edge to reduce the noises. In addition, step 504 in this embodiment can be changed to compute the scale of noise interference or the scale of texture complexity. The steps following step 504 can be amended accordingly.

For the RGB domain de-noising unit 310 in FIG. 3, a method similar to the Bayer de-noising method 400 can be applied to de-noise the output of a color interpolation unit 306 utilizing the output of a color interpolation unit 308. As a skilled person in the art would be able to implement a RGB domain de-noising unit 310 which embodies the principles of the disclosure.

Figure 6:
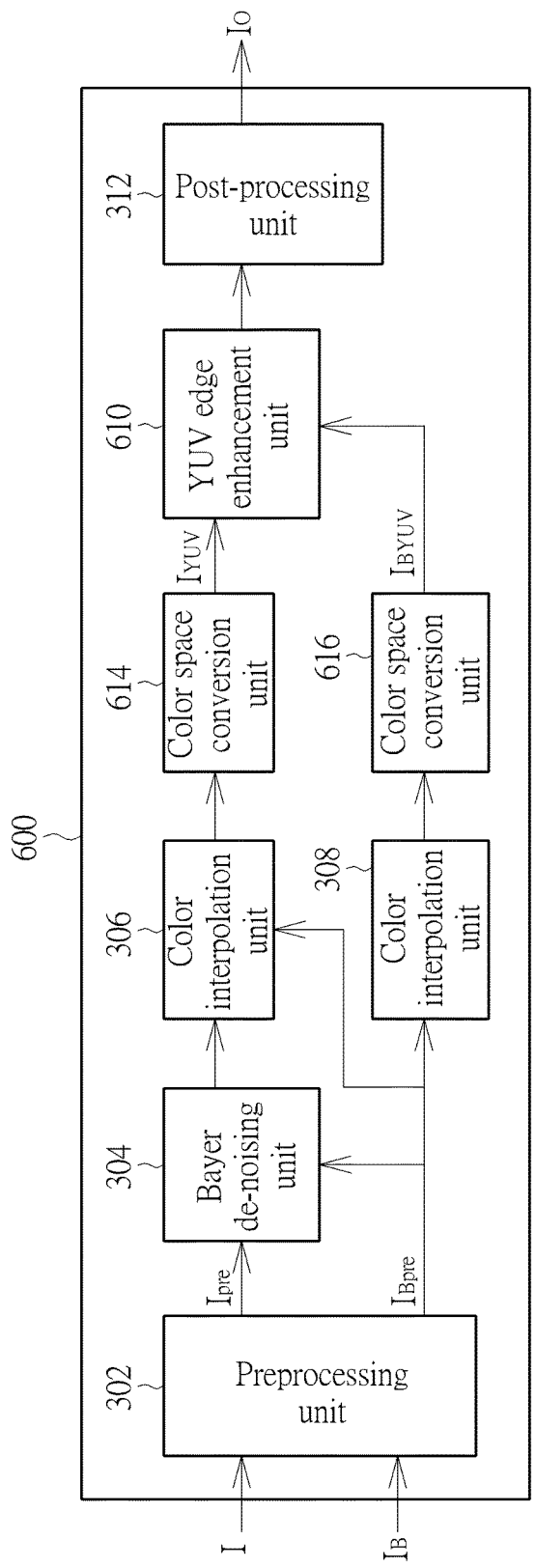
FIG. 6 is a diagram illustrating a second embodiment of the image signal processor of the present invention.

FIG. 6 is a diagram illustrating a second embodiment of the image signal processor of the present invention. As in the image signal processor 300, the image signal processor 600 generates the output image $I_O$ according to the original CFA image I and the CFA image $I_B$. However, in the image signal processor 600, the color space conversion units 614 and 616 are used to convert an image from Bayer domain to YUV domain, and output an original YUV image $I_{YUV}$ and a binnned YUV image $I_{BYUV}$. After that, a YUV edge enhancement unit 610 enhances the edges of the original YUV image $I_{YUV}$ by referencing the binned YUV image $I_{BYUV}$ then outputs the result to the post-processing unit 312.

Figure 7:
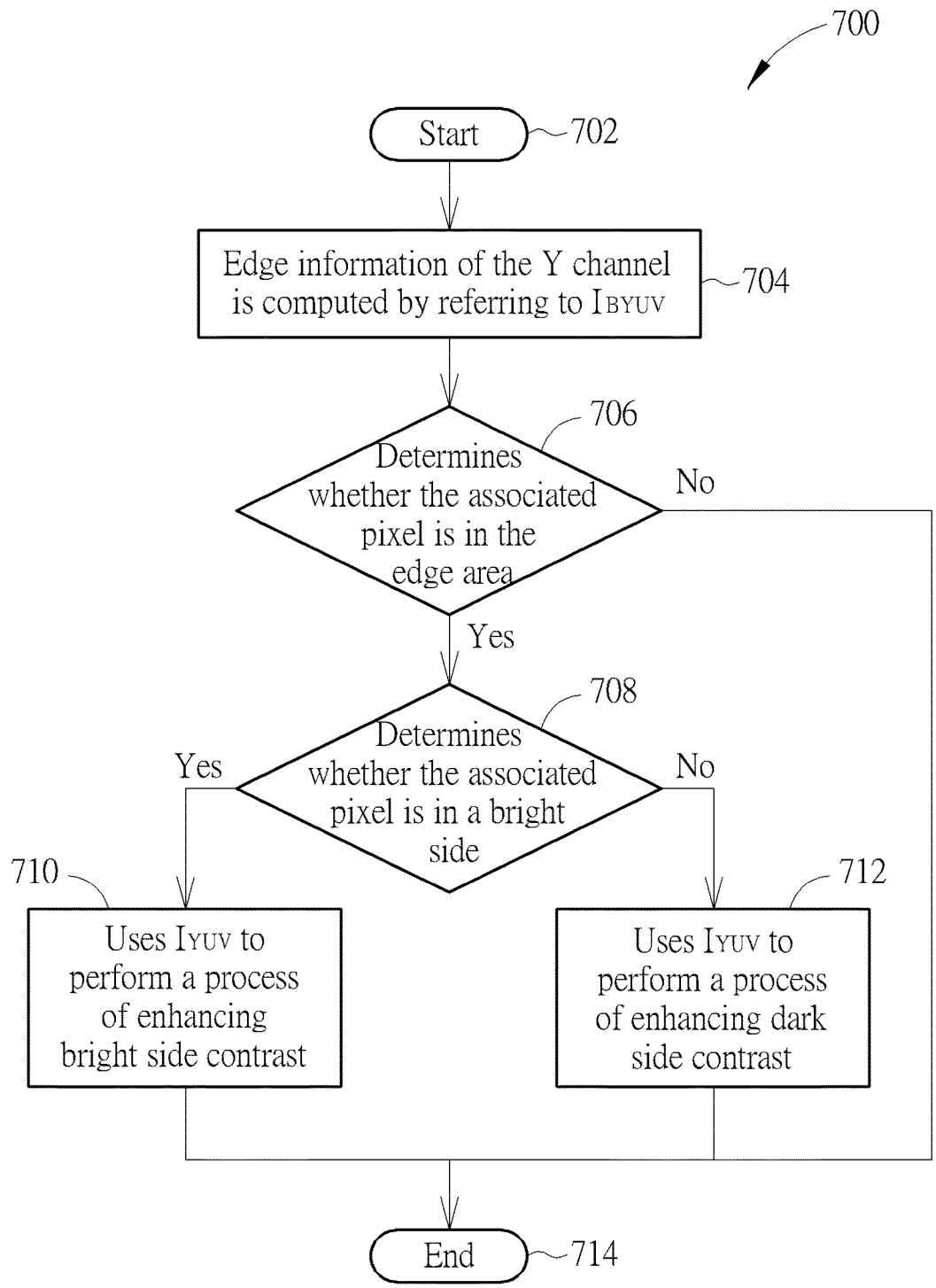
FIG. 7 is a flowchart illustrating a method of enhancing the edge of a YUV image according to the present invention.

FIG. 7 is a flowchart illustrating the method of enhancing edges of YUV of the present invention. If the same result can be obtained, the steps of the flow in FIG. 7 do not need to be followed step by step, and do not need to be executed consecutively, i.e. other steps can be inserted. In addition, some steps in FIG. 7 can be omitted according to different embodiments or design requirements. The YUV edge enhancement method 700 can be applied in the YUV edge enhancement unit 610 in FIG. 6. In step 704, an edge information of the Y channel of the original YUV image $I_{YUV}$ is computed by referring to the binned YUV image $I_{BYUV}$. In step 706, it is determined if the corresponding pixel is an edge area according to the edge information. If yes, the flow moves to step 708 to decide if the edge area that the corresponding pixel belongs to is in a bright side (i.e. where the luminance is higher). If yes, the YUV edge enhancement unit 610 performs a process of enhancing bright side contrast of the original YUV image $I_{YUV}$, e.g. increasing the luminance of the original YUV image $I_{YUV}$; otherwise (i.e. the luminance is lower and the pixel is in a dark side), the YUV edge enhancement unit 610 performs a process of enhancing dark side contrast of the original YUV image $I_{YUV}$, e.g. decreasing the luminance of the original YUV image $I_{YUV}$. In this way, the edge contrast and image sharpness can be improved while reducing false-positives of edge pixel detection (i.e. mistaken noises as edge pixels). The above embodiments are not limited to YUV domain, and the present invention can be applied in other color spaces with luminance, e.g. HSI, HSL, HSV and HSB.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image signal processing method, comprising:
   receiving an original color filter array (CFA) image and a pixel binned CFA image, wherein the pixel binned CFA image is generated by an pixel binning operation;
   performing an interpolation process on the pixel binned CFA image to generate an interpolation processed pixel binned CFA image for scaling up the image size of the interpolation processed pixel binned CFA image to be identical to an image size of the original CFA image;
   computing a specific information of the interpolation processed pixel binned CFA image; and
   processing the original CFA image according to the specific information;
   wherein the step of processing the original CFA image according to the specific information comprises:
      comparing the specific information with a threshold value to generate a comparing result; and
      processing the original CFA image according to the comparing result comprising:
         performing a first specific process on the original CFA image according to the CFA image if the comparing result indicates the specific information is greater than the threshold value and performing a second specific process on the original CFA image according to the pixel binned CFA image if the comparing result indicates the specific information is not greater than the threshold value; or
         performing the first specific process on the original CFA image according to the CFA image if the comparing result indicates the specific information is smaller than the threshold value and performing the second specific process on the original CFA image according to the pixel binned CFA image if the comparing result indicates the specific information is not smaller than the threshold value.

2. The image signal processing method of claim 1, further comprising:
   performing a pre-process on the original CFA image and the interpolation processed pixel binned CFA image.

3. The image signal processing method of claim 1, further comprising:
   performing a color space conversion process on the original CFA image and the interpolation processed pixel binned CFA image.

4. The image signal processing method of claim 1, wherein when the first specific process is an edge de-noising process, the second specific process is a non-edge de-noising process; when the first specific process is an edge interpolation process, the second specific process is a non-edge interpolation process.

5. The image signal processing method of claim 1, wherein the step of processing the original CFA image according to the comparing result comprises:
   performing a specific process on the original CFA image according to the original CFA image if the comparing result indicates the specific information is greater than the threshold value.

6. The image signal processing method of claim 5, wherein the specific process is an edge enhancing process.

7. The image signal processing method of claim 1, wherein the specific information is an edge information, a texture information, a noise floor information or an edge luminance information.

8. An image signal processor, comprising:
   an input terminal for receiving an original CFA image and a pixel binned CFA image;
   an interpolation circuit for performing an interpolation process on the pixel binned CFA image to generate an interpolation processed pixel binned CFA image for scaling up the image size of the interpolation processed pixel binned CFA image to be identical to an image size of the original CFA image;
   an operating circuit for computing a specific information of the interpolation processed pixel binned CFA image; and
   a processing circuit for processing the original CFA image according to the specific information;
   wherein the processing circuit compares the specific information with a threshold value to generate a comparing result, if the comparing result indicates the specific information is greater than the threshold value, then a first specific process is performed on the original CFA image according to the original CFA image, and if the comparing result indicates the specific information is not greater than the threshold value, then a second specific process is performed on the original CFA image according to the pixel binned CFA image or if the comparing result indicates the specific information is smaller than the threshold value, then the first specific process is performed on the original CFA image according to the original CFA image, and if the comparing result indicates the specific information is not smaller than the threshold value, then the second specific process is performed on the original CFA image according to the pixel binned CFA image.

9. The image signal processor of claim 8, further comprising:
a color space conversion circuit for performing a color space conversion process on the original CFA image and the interpolation processed pixel binned CFA image.

10. The image signal processor of claim 8, wherein when the first specific process is an edge de-noising process, the second specific process is a non-edge de-noising process; when the first specific process is an edge interpolation process and the second specific process is a non-edge interpolation process.

11. The image signal processor of claim 8, wherein the processing circuit compares the specific information with a threshold value to generate a comparing result, wherein when the comparing result indicates the specific information is greater than the threshold value, then a specific process is performed on the original CFA image according to the original CFA image.

12. The image signal processor of claim 11, wherein the specific process is an edge enhancing process.

13. The image signal processor of claim 8, wherein the specific information is an edge information.

14. The image signal processor of claim 8, wherein the specific information is an edge luminance information.

* * * * *